United States Patent
Kasamatsu

(10) Patent No.: US 6,288,833 B1
(45) Date of Patent: Sep. 11, 2001

(54) OPTICAL DEVICE

(75) Inventor: Tadashi Kasamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/505,512

(22) Filed: Feb. 17, 2000

(30) Foreign Application Priority Data

Feb. 18, 1999 (JP) .................................................. 11-040056

(51) Int. Cl.$^7$ ...................................................... H01S 3/07
(52) U.S. Cl. ............................. 359/333; 359/346; 372/6; 385/129
(58) Field of Search ..................................... 359/248, 333, 359/337, 338, 341, 344, 346; 372/43, 44, 45, 46, 47, 48, 49, 50; 385/129

(56) References Cited

U.S. PATENT DOCUMENTS

| | | | |
|---|---|---|---|
| 4,942,585 | * 7/1990 | Ungar ...................................... | 372/44 |
| 5,365,538 | * 11/1994 | Tumminelli et al. ................... | 372/66 |
| 5,400,353 | * 3/1995 | Walpole et al. ......................... | 372/46 |
| 5,463,649 | * 10/1995 | Ashby et al. ............................ | 372/40 |
| 5,526,371 | * 6/1996 | Shumulovich et al. ............... | 372/68 |
| 5,793,521 | * 8/1998 | O'Brien et al. ........................ | 359/344 |
| 5,894,492 | * 4/1999 | Welch et al. ............................ | 372/50 |
| 6,014,396 | * 1/2000 | Osinski et al. .......................... | 372/46 |
| 6,075,801 | * 6/2000 | Tamanki et al. ........................ | 372/46 |

FOREIGN PATENT DOCUMENTS

| | | |
|---|---|---|
| 5-283770 | 10/1993 | (JP) . |
| 05283770 | * 10/1993 | (JP) .................................. H01S/3/07 |

OTHER PUBLICATIONS

Optical Fiber Communication Conference '98, Technical Digest Fiber paper TuH5, pp. 45–46 held in Feb.,1998(p. 2, line 11 in the specification).

Optics Communication, vol.115, pp. 491, Apr., 1995(p. 3, line 18 in the specification).

The Review of Laser Engineering, vol. 25, p. 702, Oct. 1997 (p. 17, line 10 in the specification).

Electronic Letters, vol. 29, pp. 1500 to 1501, 1993(p. 16, line 8 in the specification).

Pelene et al., 'High slope efficiency and low threshold in a diode–pumped epitaxially grown YB: YAG waveguide laser', Optics Communications, 1995, pp. 491–497.*

Malinowski et al., 'Optimization of transversely pumped planar waveguide dielectric lasers', Lasers and Electro–optics Europe, Sep. 1996, pp. 181–181.*

Fan et al., 'Tapered Polymer Single–Mode Waveguides for Mode Transformation', Mar. 1999, Journal of Lightwave Technology, pp. 466–474.*

Ding et al., 'Transversely–Pumped Counter–Propagating Optical Parametric Oscillators and Amplifiers: Conversion Efficiencies and Tuning Ranges', IEEE Journal of Quantum Electronics, Sep. 1995, pp. 1648–1658.*

* cited by examiner

Primary Examiner—Thomas H. Tarcza
Assistant Examiner—Deandra H. Hughes

(57) ABSTRACT

An optical waveguide including a single-mode waveguide in which an induced radiation ray generated by exciting the ion propagates in a single-mode in both of a thickness direction and a width direction in the single-mode waveguide; and multi-mode waveguides disposed along both of side surfaces of the single-mode waveguide in which the ray propagates in a single-mode in a thickness direction of the multi-mode waveguide and propagates in a multi-mode in a width direction. In accordance with the present invention, the exciting ray is easily absorbed because the ray propagates to cross the single-mode waveguide without a skew-mode propagation, and the laser and the photo-amplifier which can obtain a higher output in the single-mode is provided.

13 Claims, 3 Drawing Sheets

OPTICAL DEVICE

BACKGROUND OF THE INVENTION (a) Field of the Invention

The present invention relates to an optical device which is used for implementing an external resonator lasing with a solid laser or an optical amplifier, and a laser and a laser amplifier employing an optical waveguide.

(b) Description of the Related Art

An optically excited laser/amplification device has been recently researched which contains a rare-earth element ($Er^{3+}$, $Nd^{3+}$, $Yb^{3+}$, $Tm^{3+}$, $Ho^{3+}$ and $Pr^{3+}$) or a transition metal (Ti, Cr) as active species and glass or crystals as a host material. A typical example includes a solid laser excited by a semiconductor laser and an $Er^{3+}$ doped fiber amplifier excited by a semiconductor laser. As a further advanced form, a compact and rigid active device is known which is formed by integrating a waveguide type laser and a waveguide type laser amplifier on a single silicon substrate or a quartz substrate to realize functions such as light modulation and switching on the single substrate. The research on this kind of the active device is actively conducted especially in a field of optical telecommunication.

The employment of the waveguide structure in the laser and the laser amplifier enables to spatially confine exciting laser rays to realize an extremely high excitation density. Accordingly, the laser and the laser amplifier can be operated at higher efficiencies.

As an example of a 1.55 μm range waveguide type optical amplifier, an Yb/Er-doped phosphorous glass waveguide type laser amplifier is described in "Optical Fiber Communication Conference '98, Technical Digest, Paper TuH5, p.p.45–46 held in February, 1998". FIG. 1 is a schematic diagram showing an example of such a conventional waveguide type optical amplifier.

In the waveguide type optical amplifier shown in FIG. 1, a single-mode signal transmission fiber 104 which propagates a signal ray 100 and a single-mode exciting ray transmission fiber 105 which propagates an exciting ray emitted from a single-mode semiconductor laser 106 are coupled to an Er/Yb-doped phosphorous glass waveguide 102 by way of a multiplexing coupler 101.

The single-mode semiconductor laser 106 functioning as an excitation light source is of a single transverse-mode type having a wavelength of 980 nm and an output power of 180 mW The Er/Yb-doped phosphorous glass waveguide 102 contains Yb and Er at 4% in weight and 2% in weight, respectively, and has a waveguide length of 86 mm. The optical amplification characteristics of the waveguide 102 include a maximum amplification gain of 27 dB, a noise figure of 4 dB and a saturated output of 14 dBm (25 mW) at a 1.5 μm range. The waveguide 102 which may be formed by a two-step ion exchange technique performs single-mode propagation at the 1.5 μm range and multi-mode propagation at the 0.96 μm range. A $TE_0$ propagation mode size (a size at which the electric field becomes "1/e" of the maximum) of the waveguide 102 typically includes a thickness of 6.4 μm and a width of 7.3 μm at the 1.55 μm range and both a thickness and a width of about 5 μm at the 0.98 μm range.

An example of a waveguide type laser was reported at the Southampton University, England (Optics Communication, vol.115, p.p.491, April, 1995). Schematic configuration of the waveguide type laser is shown in FIG. 2A, and its sectional structure is shown in FIG. 2B.

In the waveguide type laser shown in FIG. 2A, an exciting ray emitted from a multi-mode semiconductor laser 107 is incident on the facet of an Yb:YAG waveguide 113 through a beam splitter 108, a neutral density filter 109 and an objective lens (magnification: 10 times) 110 in this order.

The Yb-YAG waveguide 113 includes an Yb:YAG waveguide core 117 formed on a YAG substrate 119 by means of epitaxial growth in a liquid phase, and a cladding layer (YAG crystal) 116 formed as the top part of the waveguide. A layer thickness of the Yb:YAG waveguide core 117 is 6 μm, a thickness of the cladding layer 116 is 19 μm, and a difference between specific refractivities of the Yb:YAG waveguide core 117 and the clad layer 116 is $1.4 \times 10^{-2}$. The waveguide is of a multi-mode type having a waveguide length of 1.6 mm, and both the exciting ray 115 and the laser ray admit up to three propagation modes in 1 μm range laser ray in the transverse direction. After the both facets of the waveguide are polished, a resonator is formed by but-jointing thereto resonator mirrors including a rear mirror 111 and an output mirror 112.

In the waveguide type laser having such a configuration, the multi-mode semiconductor laser ray 115 for excitation is focused on the facet of the Yb:YAG waveguide 113 by the objective lens 110 constituting an excitation optical system. At the focused point, Gaussian distribution having a diameter of 6 μm and a light intensity of $1/e^2$ is generated in a thickness direction (Y-direction) of the waveguide, and top-hat distribution having three peaks of a diameter of 20 μm is generated in a direction parallel to the waveguide. The profiles of laser rays 114 are of a multi-mode having a main peak and two side peaks in the thickness direction (Y-direction) of the waveguide, and approximated Gaussian oscillation having a diameter of 60 μm and a light intensity of $1/e^2$ is generated in a transversal direction (X-direction). In the waveguide laser employing the multi-mode semiconductor laser 107 as the excitation light source at the excitation power of 400 mW, 1.03 μm range lasing output of 250 mW, a slope efficiency of 77% and a threshold of 43 mW are achieved.

The maximum output power of the above-described conventional laser/amplifier is about 250 mw (multi-mode) for the waveguide laser output and about 14 dBM (25 mW) for the waveuide optical amplifier saturated output.

The waveguide laser/amplifier is required to be single-moded at a signal band (1.55 μm range and 1.3 μm range) considering the adjustment with high-speed optical telecommunication including single mode fibers as transmission paths. Realization of a higher output single mode laser/amplifier is required to satisfy a higher capacity and multi-channels of recent telecommunication. Accordingly, developments of the higher output single mode laser/amplifier become an important subject.

A simplest means for implementing the waveguide laser/amplifier having the high power is to increase an excitement power. In order to realize a higher laser output (over 1 W), a semiconductor laser for excitation having a higher power is necessary. A spatial mode of the semiconductor laser depends on an output power level, and a spatial single mode output (active layer width: 2 to 3 μm) is about 100 to 200 mW (wavelength: 980 nm) at the current technical level. For obtaining the high output semiconductor laser, a method of extending the active layer width of the laser is generally used, and in the case, a lasing transversal mode is made multiplex. A standard of the semiconductor laser output is such that the output of 1 W is generated per the active layer length of 100 μm, and a maximum output of 4 W is currently obtained in the active layer length of 500 μm in the multi-mode semiconductor laser. A beam quality of such a multimode semiconductor laser is 20 to 100 times a diffraction limit ($M^2$ value=20 to 100).

However, in case that such a multi-mode semiconductor laser is used as an excitation light source for the waveguide laser/amplifier, an optical bonding to the single-mode waveguide cannot be achieved at a higher efficiency due to the lower horizontal mode quality. Accordingly, a problem arises that a lower efficiency of a device (light/light conversion efficiency) is likely to occur.

The higher efficiency optical bonding of the semiconductor laser ray can be realized by using a multi-mode waveguide, but the horizontal mode of an output ray becomes a multi-mode.

As a means for overcoming the disadvantage, JP-A-5 (1993)-283770 describes an optical signal amplifier in which a single-mode waveguide surrounds a single-mode waveguide on which an exciting ray is incident. However in the photo signal amplifier, since the single-mode path is surrounded by the multi-mode waveguide in its thickness direction and in a direction parallel to a substrate, skew-mode propagation (round ray) occurs to lower an exciting ray absorption efficiency.

SUMMARY OF THE INVENTION

In view of the foregoing, an object of the present invention is to provide an optical waveguide, and a waveguide laser and a waveguide optical amplifier which can generate a higher output in a single-mode including the optical waveguide.

The present invention provides an optical waveguide formed on a substrate including: a single-mode waveguide containing a rare-earth group ion and/or a transition metal ion in which an induced radiation ray generated by exciting the ion propagates in a single-mode in both of a thickness direction and a width direction in the single-mode waveguide; and multi-mode waveguides disposed along both of side surfaces of the single-mode waveguide in which the ray for exciting the rare-earth group ion and/or the transition metal ion propagates in a single-mode in a thickness direction of the multi-mode waveguide and propagates in a multi-mode in a width direction.

In a further aspect of the present invention, the ray may propagate in the multi-mode waveguides in the multi-mode.

In accordance with the present invention, since the exciting ray is absorbed while propagating to cross the single-mode waveguide without a skew-mode propagation, the laser and the optical amplifier which can obtain a higher output in the single-mode can be provided.

In the laser and the optical amplifier of the present invention having the tapered multi-mode waveguides which propagate the exciting ray, the spatial overlapping between the exciting ray and the single-mode waveguide becomes larger to elevate an absorption efficiency of the exciting ray in the single-mode waveguide to provide the laser and the photo-amplifier having a higher output and a higher efficiency. The elevation of the absorption efficiency of the exciting ray enables the reduction of the waveguide length to provide the compact and rigid laser and the compact and rigid optical amplifier.

The multi-mode waveguides having a plurality of input waveguides can provide the laser and the photo-amplifier having a still higher output because a remarkably larger excitation power can be obtained.

The above and other objects, features and advantages of the present invention will be more apparent from the following description.

PREFERRED EMBODIMENTS OF THE INVENTION

First Embodiment

Figure 1:
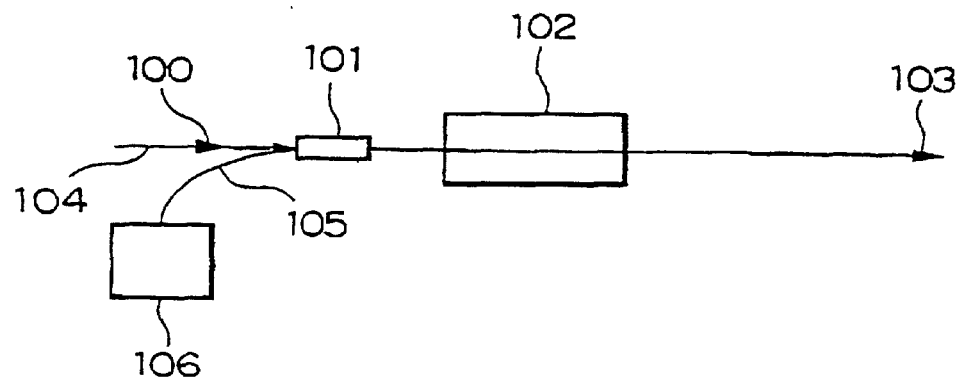
FIG. 1 is a schematic diagram showing a conventional waveguide photo-amplifier.
Figure 2A:
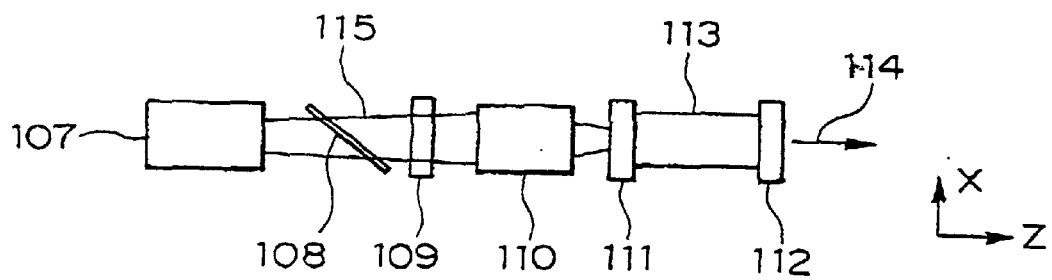
FIG. 2A is a schematic diagram showing an example of a conventional waveguide laser.
Figure 2B:
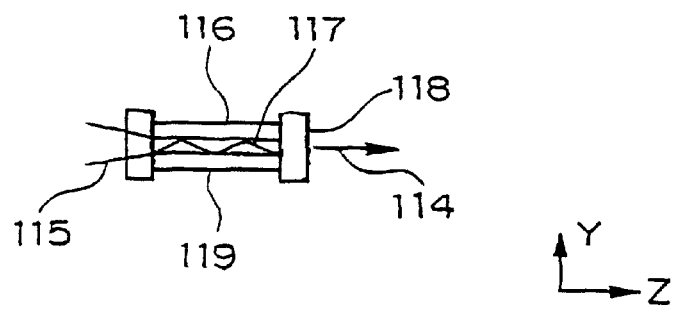
FIG. 2B is a vertical sectional view of a waveguide in FIG. 2A.

Now, the present invention is more specifically described with reference to accompanying drawings in which description of similar elements to those of FIGS. 1, 2A and 2B is omitted by affixing the same numerals thereto.

Figure 3A:
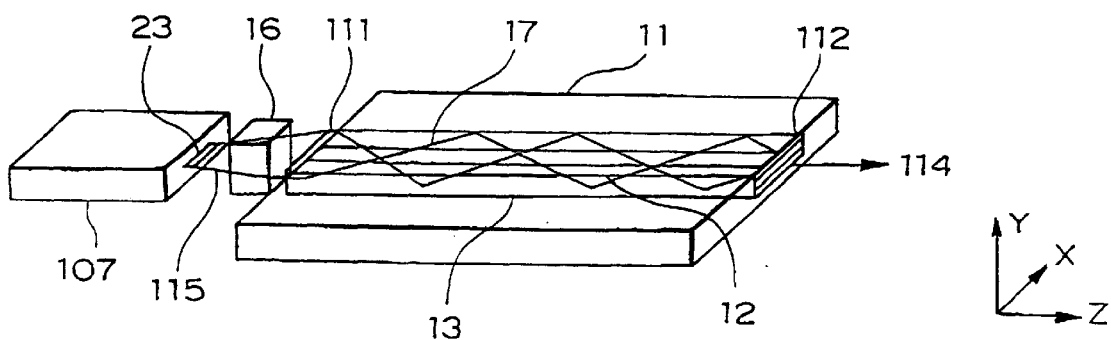
FIG. 3A is a schematic perspective view showing a waveguide laser in accordance with a first embodiment of the present invention.

A waveguide lasing apparatus shown in FIG. 3A includes a multi-mode semiconductor laser 107, an excitation optical system 16 and an external resonator. A width of an active layer (light generation layer) 23 is between 20 $\mu$m and 500 $\mu$m, desirably between 50 $\mu$m and 200 $\mu$m. This is because the width of the semiconductor laser light generating width is desirably narrower for bonding with a single-mode waveguide 12 and a width of the single-mode waveguide 12 of the external resonator is generally between 6 and 10 $\mu$m, and some extent of the light generation width is required for the higher output.

The optical waveguide used in the external resonator includes the single-mode waveguide 12 and multi-mode waveguides 13 on an optical substrate (for example, made of silicon or quartz) 11. In the single-mode waveguide 12, an induced generation ray generated by exciting a rare-earth metal ion or a transition metal added thereto propagates in a single-mode in both directions of its thickness and its width. The multi-mode waveguides 13 are disposed along the both sides of the single-mode waveguide 12, and an exciting ray propagates in a single-mode in its thickness direction of the waveguide and in a multi-mode in its width direction.

The configuration of the single-mode waveguide 12 and the multi-mode waveguides 13 will be concretely described.

A process of forming the single-mode waveguide 12 is not especially restricted as long as a waveguide having a high quality and a light propagation loss is small such as an ion exchange process, a liquid-phase epitaxially growing process and a chemically gas-phase growing process. A rare-earth group element is added to the single-mode waveguide 12 by employing an appropriate method. The added element is selected to have a desired laser/laser amplification operation. For example, an $Er^{3+}$ ion is preferable for 1.55 $\mu$m range and an $Yb^{3+}$ ion and a $Nd^{3+}$ ion are suitable for a 1

μm range. Another element, other than an active element for obtaining a desired laser output, which functions as a sensitized agent for effectively absorbing the exciting semiconductor laser ray and converting the energy to the active element may be doped into the single-mode waveguide 12. The absorption efficiency can be increased by co-adding an $Yb^{3+}$ ion to an $Er^{3+}$ ion.

The dimensions of the single-mode waveguide 12 are determined in single-mode propagation conditions at a desired laser output wavelength. For example, in a quartz glass based step index-type waveguide, a 1.55 μm range single mode propagation is made possible by using a waveguide section having 9 μm square and a specific refractive index of 0.3%.

Figure 3B:
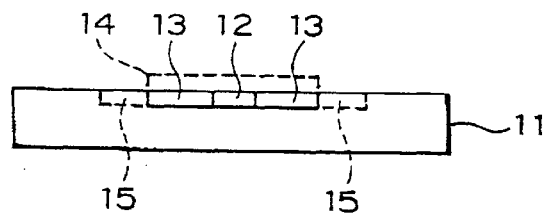
FIG. 3B is a vertical sectional view of a waveguide in FIG. 3A.

The multi-mode waveguides 13 for guiding the exciting ray are disposed along the both sides of the single-mode waveguide 12 on the substrate 11 as shown in FIG. 3B. Clad layer 15 may be disposed on the outer ends of the multi-mode waveguides 13.

The refractive indexes of the respective elements are determined by satisfying a relationship of (single-mode waveguide 12)>(multi-mode waveguides 13)>(substrate 11 or cladding layer 15 of multi-mode waveguides 13). If necessary, the refractive index of the substrate 11 can be made higher by adding a dopant such as germanium to the multi-mode waveguides 13 or the single-mode waveguide 12.

A top clad layer 14 may be formed on the waveguides including the single-mode waveguide 12 and the multi-mode waveguides 13 as shown in FIG. 3B. The top clad layer 14 can prevent waveguide characteristics from being largely influenced by a condition change of a whole reflection surface due to an external circumference change (for example, humidity) and contamination (dust and garbage) generated at a so-called air clad at which the waveguide is directly in contact with an air layer, and can further protect the waveguide. Although an embedded waveguide is shown in the structure of FIG. 3B, a ridge-shaped waveuide can be employed.

The dimensions of the multi-mode waveguide 13 are determined such that a single-mode propagation occurs in a thickness direction (Y-direction) and a multi-mode propagation between 20 μm and 200 μm occurs in a width direction (X-direction). The numeral of the multi-mode waveguide 13 are about 0.1 to 0.2 in the thickness direction (Y-direction) and about 0.2 to 0.5 in the width direction (X-direction). In order to realize a higher NA waveguide in the width direction, a larger difference of the refractive indexes is required. In this case, a polymer such as low refractive index plastics and a resin cured by an ultraviolet ray may be selected as a material of the clad layer 15 of the multi-mode waveguide 13.

A dielectric multi-layered coat (resonator rear mirror 111) which permeates whole wavelengths of a semiconductor laser ray for excitation (exciting ray) and reflects whole wavelengths of a desired lasing is formed on an input facet of the waveguides including the single-mode waveguide 12 and the multi-mode waveguides 13, and another dielectric multi-layered coat (resonator output mirror 112) which reflects a part of the lasing wavelengths is formed on an output facet. The resonator rear mirror 111 and the resonator output mirror 112 form a laser resonator. A permeation rate of the resonator output mirror 111 can be most suitably determined by a practical laser gain (depending on an excitation power and an energy level structure of an active ion) per one pass of the waveguide and a propagation loss of the waveguide. A typical reflectivity of a partial reflection mirror is about between 80% and 98%. Refer to a formula (3.67) in a publication written by W. Koechner, Solid State Laser Engineering, 4th edition, p.100, Springer-Verlag for details.

Then, a lasing operation of the waveguide laser of the present embodiment will be described.

An exciting ray 115 ejected from the multi-mode semiconductor laser 107 for excitation is reshaped to have a suitable beam diameter in the excitation optical system 16 and gathered on the facet of the waveguide. The exciting ray 115 permeates the resonator rear mirror 111 to propagate the multi-mode waveguide 13. At this stage, a light-gathering spot size is that in agreement with the section of the multi-mode waveguide 13. A beam divergent angle of the gathered beam is not more than the number of apertures (NA) of the multi-mode waveguide 13. Thereby, the multi-mode semiconductor laser beam is bonded to the waveguide at a higher efficiency and propagates.

During the propagation step, a waveguide ray 17 is generated across the single-mode waveguide 12. The waveguide ray 17 is absorbed by the active ion or a sensitive ion doped into the single-mode waveguide 12. The continuance of the multi-mode propagation permits the passage of all rays through the single-mode waveguide 12. Principally, a sufficiently long waveguide absorbs the exciting ray at a higher efficiency. This can be explained as follows.

A so-called double clad structure fiber includes a single-mode core through which a signal ray passes and a multi-mode core surrounding the single-mode core. The multi-mode core functioning as a clad for the signal ray guides a multi-mode semiconductor laser ray for excitation. The exciting laser beam in the multi-mode propagation is absorbed in the single-mode core or a signal core (refer to Electronics Letters, vol.29, pp.1500 to 1501, 1993). When the center of the core is biased (offset) or the clad is rectangular or D-shaped, the exciting ray always and principally crosses the core and is absorbed at a higher efficiency (90% or more) when the fiber is sufficiently long. In the present embodiment, a similar phenomenon occurs.

The largest difference other than the waveguide structure of the present embodiment between the double clad fiber and the present embodiment is that the structure of the multi-mode wave,uide includes the multi-mode in the width direction and the single-mode in the thickness direction. In the double clad fiber, the multi-mode propagation occurs in both of the thickness direction and the width direction, and a long path length and a high concentration doping are required for absorbing the exciting ray. This is because a practical absorption coefficient can be estimated by a formula of practical absorption coefficient of exciting ray)=(absorption coefficient of single-mode waveguide of exciting ray)× (sectional area of single-mode waveguide)/(sectional area of multi-mode waveguide), and an absorption coefficient of a typical double clad fiber (core diameter is 10 μm and clad is a rectangular of 100 μm×200 μm) lowers to 1/200 of the core. In order to compensate this, the high concentration doping of the active ion and the sensitized ion is needed. A further detailed description is found in "The Review of Laser Engineering, vol.25, p.702, October, 1997".

In the present embodiment, (sectional area of single-mode waveguide)/(sectional area of multi-mode waveguide) is about ½ to 1/20, and sufficient reduction of the length is possible to make the waveguide. This reduction can be achieved by utilizing the beam quality of the semiconductor laser for excitation in which the single-mode appears in a direction perpendicular to a p-n junction surface and the multi-mode appears in a direction parallel to the p-n junction surface and the multi-mode waveguides are formed in the width direction in adjustment therewith.

An example of experimentally manufacturing the waveguide laser having the above configuration will be described.

In the present example, a multi-mode waveguide was formed in an Yb:YAG single-mode waveguide. After a semiconductor laser for excitation (wavelength: 940 nm, output: 1.6 W, light generation width: 100 μm) was collimated by a collimator lens (focal distance: 6.5 mm, NA=0.5), the light generation width was enlarged three times by an anamorphic prism pair. The ray could be gathered to an area having a diameter of 30 μm and a thickness of about 5 μm in a direction of the waveguide by a non-spherical lens (f=3 mm). The semiconductor laser ray for excitation could propagate and be bonded at a higher efficiency when the multi-mode waveguides had a width of 30 μm, a thickness of 6 μm and a width direction NA of 0.4.

In this example, an LD power of 1.2 W could be incident on the waveguide at a through-put efficiency of the excitation optical system of 95% and an incident bonded efficiency of 80% by employing a semiconductor laser power of 1.6 W.

The absorption in the waveguide of 90% or more could be secured at an ytterbium (Yb) concentration of 10 atomic % and a waveguide of 7.5 mm, and a lasing output of 0.84 W (lasing efficiency of 70%) was obtained. The absorption coefficients are determined as follows. Since the absorption coefficient of the $Yb^{3+}$ at 940 nm is about 1 $cm^{-1}$/atomic %, the absorption coefficient of the core is 10 $cm^{-1}$. Since the ratio between the core area and the multimode clad is 6/30=1/5, the practical absorption coefficient is 10/5=2 $cm^{-1}$. The waveguide having a length of 7.5 mm absorbed 78% per a single pass and 95% or more per double passes.

Second Embodiment

In the present invention, a waveguide structure is not restricted to that of the first embodiment, and various structures of effectively absorbing an exciting ray can be employed.

As a second embodiment, a preferred example thereof will be described.

Figure 4:
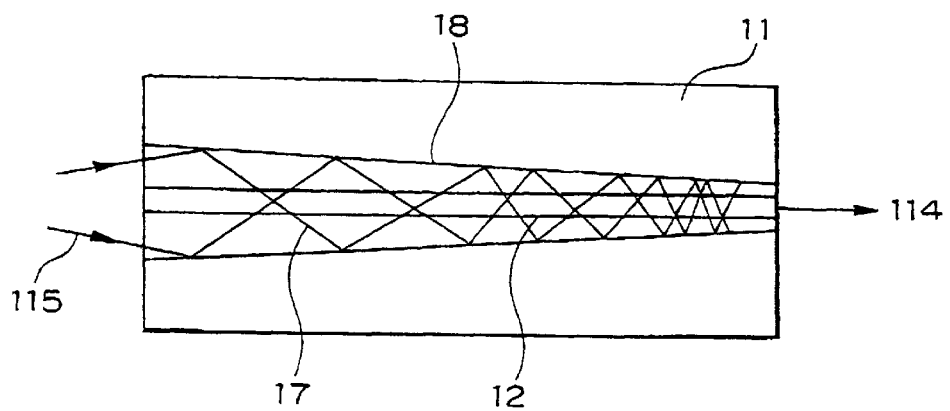
FIG. 4 is a schematic view showing a waveguide structure which can effectively absorb an exciting ray in accordance with a second embodiment.

Referring to FIG. 4, a waveguide of the present embodiment different from that of the first embodiment shown in FIGS. 3A and 3B includes a tapered multi-mode waveguide 18 of which a width is reduced towards a propagation direction of an exciting ray. Since the propagating exciting ray 17 is confined in a narrower space in such a tapered structure, the absorption rate of the exciting ray in the propagation step can be made larger than that when the width of the waveguide is fixed. For example, when the width of the waveguide at the incident facet was 30 μm and that at the output facet was about 15 μm, an absorption rate was obtained at a waveguide length of 5.7 mm while a waveguide length of 7.5 mm was needed for obtaining a similar absorption rate by employing the waveguide having the fixed width.

Since the Yb:YAG laser is a quasi-third level laser, a base level absorption occurs in a region doped with an active ion. Since the absorption of a lasing ray is generated, the length of the waveguide is desirably as short as possible. The selection of the length of the waveguide may be moderately conducted when the active ion is a fourth level laser such as $Nd^{3+}$.

The dimensions of the whole apparatus can be made compact by employing the tapered multi-mode waveguide for propagating the exciting ray.

Third Embodiment

Figure 5:
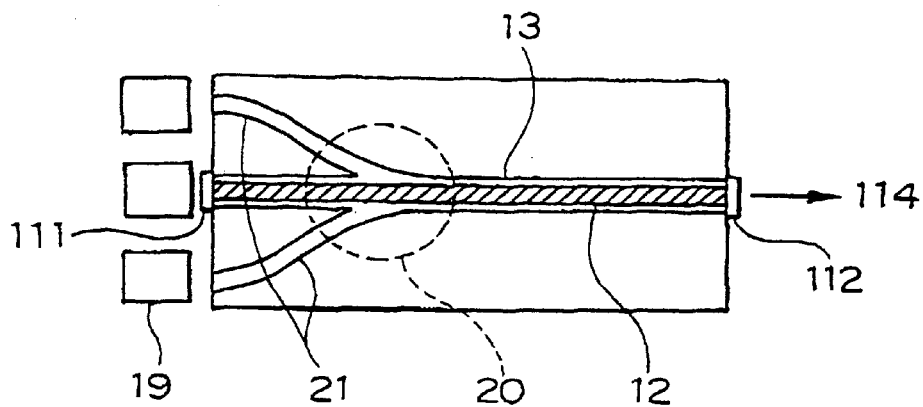
FIG. 5 is a schematic view showing a waveguide laser in accordance with a third embodiment.

A third embodiment exemplifies a waveguide laser having a higher output than that of the first embodiment The waveguide laser of the present embodiment shown in FIG. 5 is different from that shown in FIGS. 3A and 3B in that a waveguide of an input side of a multi-mode waveguide 13 includes a plurality of multi-mode waveguides 21. Also in the respective multi-mode waveguides 21, an exciting ray propagates in a single-mode in a thickness direction and in a multi-mode in a width direction. These multi-mode waveguides 21 are combined to form a single waveguide by means of a wave adder 20.

The respective multi-mode semiconductor lasers 19 (excitation optical systems are not shown) are mounted on input facets of the multi-mode waveguides 21. In place of the multi-mode semiconductor lasers 19, a so-called "semiconductor laser bar" including light generating elements disposed in an array having a space among them three or four times larger than a light generation width can be used.

Similarly to the apparatus of FIG. 3, a single-mode waveguide 12 doped with an active ion and penetrating the wave adder 20 is centrally disposed between multi-mode waveguides 13. On facets of input waveguides including the single-mode waveguide 12 and the multi-mode waveguides 13, a resonator rear mirror 111 and a resonator output mirror 112 are mounted.

In the waveguide laser having the above configuration, the multi-mode semiconductor laser ray (exciting ray) combined by the wave adder 20 excites an active ion while crossing the single-mode waveguide (core) 12 similarly to the apparatus of the first embodiment.

In the waveguide structure of the present embodiment, the multi-mode waveguides 13 after the wave adder 20 may have a tapered structure.

Although the number of the input waveguides and the semiconductor lasers is three, the number can be freely modified depending on its design.

When bar-type semiconductor lasers are employed, 20 to 25 light generation elements are linearly aligned so that the responding input waveguides are required.

Fourth Embodiment

Figure 6:
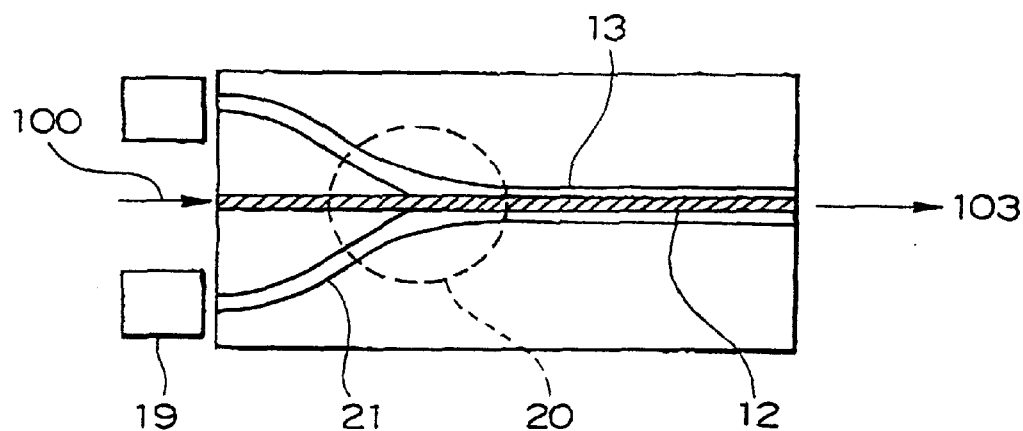
FIG. 6 is a schematic view showing a waveguide photo-amplifier in accordance with a fourth embodiment.

Referring to FIG. 6, a waveguide photo-amplifier in accordance with a fourth embodiment having input waveguides including a single-mode waveguide 12 and multi-mode waveguides 13 is shown, and each of the input waveguides has the respective excitation light sources.

The waveguide photo-amplifier includes two multi-mode semiconductor lasers 19 for excitation (excitation optical systems are not shown), and each of the multi-mode semiconductor lasers 19 has a multi-mode waveguide 21. These multi-mode waveguides 21 are symmetrically disposed with respect to the single-mode waveguide 12, and combined with each other by means of a wave adder 20 to form a single waveguide. An input signal 100 can be incident on an input facet of the single-mode waveguide 12, but no mirrors for forming a resonator are disposed on the both facets of the single-mode waveguide 12.

In the waveguide photo-amplifier having such a configuration, an exciting ray ejected from each of the multi-mode semiconductor lasers 19 propagates in the input multi-mode waveguides 21 and is combined in the wave adder 20. The exciting ray combined at the wave adder 20 excites an active ion while crossing the single-mode waveguide (core) 12 in a propagation step similarly to the apparatus of the first embodiment. A signal ray is incident on a facet of the single-mode waveguide 12, and the signal ray is excited by a rare-earth ion or a transition metal ion to generate stimulated emission which enables the photo-amplification. The amplified signal ray 103 is ejected from the other facet.

In the present embodiment, the active ion in the single-mode waveguide 12 is desirably $Er^{3+}$ or co-addition of $Er^{3+}$ and $Yb^{3+}$ for optically amplifying a 1.55 μm range. Especially when the $Yb^{3+}$ is co-added, an absorption coefficient per a unit length of the waveguide can be increased by two orders, and a laser ray in a wavelength band from 0.8 to 1.1 μm can be absorbed. Thereby, a further reduction of the waveguide length can be realized.

Fifth Embodiment

Figure 7:
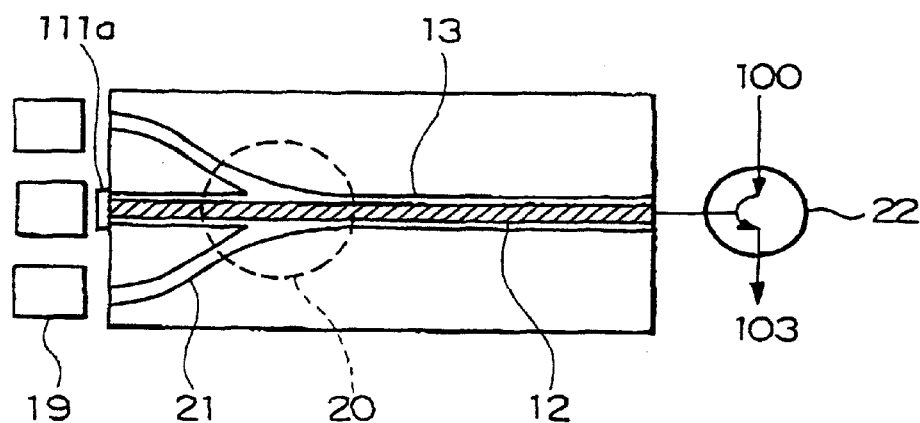
FIG. 7 is a schematic view showing a pass-type waveguide photo-amplifier in accordance with a fifth embodiment.

Referring to FIG. 7, a two-pass-type waveguide photo-amplifier in accordance with a fifth embodiment is shown. The waveguide photo-amplifier includes a waveguide structure similar to that shown in FIG. 5, and each of multi-mode waveguides 21 has a multi-mode semiconductor laser 19 (excitation optical systems are not shown). In the present embodiment, no mirrors for forming a resonator are disposed on the both facets of input waveguides including a single-mode waveguide 12 and a multi-mode waveguide 13. Instead thereof, a total reflection mirror 111a is mounted on an input facet for an exciting ray, and a photo-circulator 22 is mounted on an output facet for a signal ray.

In the waveguide photo-amplifier of the present embodiment, similarly to the apparatus of FIG. 5, a multi-mode semiconductor laser ray (exciting) combined by a wave adder 20 excites an active ion while crossing the single-mode waveguide (core) 12. An input signal ray 100 is incident on the single-mode waveguide 12 from a signal ray input and output facet (an opposite facet of the total internal reflection mirror 111a) by way of the photo-circulator 22. The incident input signal ray 100 propagates in the single-mode waveguide 12 to reach the total reflection mirror 111a. After the reflection thereby, the input signal ray 100 again propagates in the single-mode waveguide 12 to be ejected from the signal ray input and output facet. The input signal ray 100 is effectively amplified by means of the reciprocation step (two passes).

Also in the present embodiment, the multi-mode waveguides 13 after the wave adder 20 may have a tapered structure. Further, a dumbbell type multi-mode waveguide may be used in which maintaining of a constant width and a tapered width increase sequentially follow the tapered width reduction.

The arrangements shown in FIGS. 5 to 7 employing a plurality of the semiconductor lasers for excitation are only examples, and the exciting ray waveguides can be freely arranged depending on design. An arrangement of the multi-mode waveguides which can be excited in forward and reward directions implements elevation of an excitation efficiency, and reduction of a noise in case of an optical signal amplifier. In case of an Er-doped fiber amplifier, the forward direction excitation (the directions of the exciting ray and the signal ray are the same) realizes a low noise characteristic and the reward direction excitation (the direction of the exciting ray is opposite to that of the signal ray) utilizes a higher excitation efficiency.

When the plurality of the semiconductor lasers shown in FIGS. 5 to 7 are employed, the active ion is not added to the single-mode waveguide upstream of the wave adder and may be added downstream of the wave adder. In the third level laser containing the Er and the Yb, a base level absorption occurs to lower the efficiency at a non-excited part where no exciting ray passes and is absorbed. In order to prevent the phenomenon, no active ions are preferably added to the non-excited part. However, the fourth level laser including Nd is not applied thereto.

In the above description, the Yb:YAG laser and the Er-doped amplifier are exemplified as a laser and an amplifier, respectively However, the present invention is not restricted to the above materials, and can be applied to all photo-excitable materials. Example as a laser material include Nd:YVO4(808 nm), Nd:YLF (795 nm), Yb:LuAG (940 nm or 970 nm) and Yb:YLF (940 nm) at a 1 μm range, Tm:YAG (795 nm), Ho:YLF (795 nm), Tm, Ho:YAG (795 nm) and Ho:YLF (795 nm) at a 2 μm range, Er:YAG (968 nm) and Er:YLF (968 nm) at a 3 μm range, and Cr:LiSAF (650 nm) at a visible radiation range. These materials can be excited by the semiconductor laser having the wavelength indicated in the respective brackets.

A periodically polarization-reversing element can be formed on an elongated line in a propagation direction of the single-mode waveguide. Thereby, the wavelength change of the laser ray may be possible. Secondary harmonic generation and photo-parametric lasing are also possible.

In the respective embodiments, the excitation optical system is employed as a means for making the semiconductor laser ray ejected from the multi-mode semiconductor laser for excitation incident on the multi-mode waveguides, but instead thereof, the semiconductor laser ray may be directly combined to the multi-mode waveguides by employing the fiber.

Since the above embodiments are described only for examples, the present invention is not limited to the above embodiments and various modifications or alternations can be easily made therefrom by those skilled in the art without departing from the scope of the present invention.

What is claimed is:

1. An optical device comprising:
    an optical substrate;
    a single-mode waveguide overlying the optical substrate and containing rare-earth group ions and/or transition metal ions, the single-mode waveguide propagating an induced radiation ray, generated by exciting the ions, as a single-mode wave in both a thickness direction and a width direction; and
    a pair of multi-mode waveguides, disposed along both side surfaces of the single-mode waveguide, for propagating an exciting ray for exciting the rare-earth group ions and/or the transition metal ions, the exciting ray propagating as a single-mode wave in a thickness direction of the multi-mode waveguide and as a multi-mode wave in a width direction.

2. The optical device as defined in claim 1, wherein the multi-mode waveguides further comprise a plurality of input waveguides for receiving the exciting ray, and a wave adder for adding the exciting rays.

3. An optical device comprising:
    an optical substrate;
    a single-mode waveguide overlying the optical substrate and containing rare-earth group ions and/or transition metal ions, the single-mode waveguide propagating an induced radiation ray, generated by exciting the ions, as a single-mode wave in both a thickness direction and a width direction; and
    a pair of multi-mode waveguides, disposed along both side surfaces of the single-mode waveguide, for propagating an exciting for exciting the rare-earth group ions and/or the transition metal ions, as a multi-mode wave,
    at least a part of each of the multi-mode waveguides including a tapered shape having a reduced width toward a propagation direction of the exciting ray.

4. The optical device as defined in claim 3, wherein the multi-mode waveguides comprise a plurality of input waveguides each for receiving an exciting ray, a wave adder for combining the exciting rays propagating in the input waveguides, and the part of the waveguide in which the exciting rays combined by the wave adder propagate includes the tapered shape.

5. The optical device as defined in claim 3, wherein the rare-earth group ion is selected from the group consisting of $Er^{3+}$, $Nd^{3+}$, $Yb^{3+}$, $Tm^{3+}$, $Ho^{3+}$ and $Pr^{3+}$, and the transition metal ion is selected from the group consisting of Ti and Cr.

6. A waveguide laser comprising the optical waveguide as defined in claim 3;
- an optical resonator, mounted on a facet of the single-mode waveguide forming the optical waveguide, including a first mirror which totally reflects the induced radiation ray generated by excitation of the rare-earth group ion and/or the transition metal ion contained in the single-mode waveguide; and a second mirror, mounted on the other facet, which partially reflects the induced radiation ray;
- a multi-mode semiconductor laser for excitation which ejects a multi-mode laser ray for exciting the rare-earth group ion and/or the transition metal ion; and
- an input element for making the multi-mode laser ray incident on the multi-mode waveguides constituting the optical waveguide.

7. A waveguide laser comprising the optical waveguide as defmed in claim 3;
- an optical resonator, mounted on a facet of the single-mode waveguide and the multi-mode waveguides forming the optical waveguide, including a first mirror which totally reflects the induced radiation ray generated by excitation of the rare-earth group ion and/or the transition metal ion contained in the single-mode waveguide; and a second mirror, mounted on the other facet, which partially reflects the induced radiation ray;
- a multi-mode semiconductor laser for excitation which ejects a multi-mode laser ray for exciting the rare-earth group ion and/or the transition metal ion; and
- an input element for making the multi-mode laser ant ray incident on the multi-mode waveguides constituting the optical waveguide.

8. A waveguide laser comprising the optical waveguide as defined in claim 4;
- an optical resonator, mounted on a facet of the single-mode waveguide forming the optical waveguide, including a first mirror which totally reflects the induced radiation ray generated by excitation of the rare-earth group ion and/or the transition metal ion contained in the single-mode waveguide; and a second mirror, mounted on the other facet, which partially reflects the induced radiation ray;
- a plurality of multi-mode semiconductor lasers for excitation mounted on each of the input waveguides of the multi-mode waveguides constituting the optical waveguide, which eject a multi-mode laser ray for exciting the rare-earth group ion and/or the transition metal ion; and
- a plurality of input elements mounted on each of the multi-mode semiconductor lasers for excitation for making the multi-mode laser ray ejected from each of the multi-mode semiconductor lasers for excitation incident on the input waveguide corresponding to the multi-mode waveguides.

9. The waveguide laser as defined in claim 8, wherein a semiconductor laser bar including a plurality of light generation elements linearly disposed having a specified space among them is mounted in place of the multi-mode semiconductor lasers for excitation, and the laser rays ejected from each of the light generation elements of the semiconductor laser bar are incident on the plurality of the input elements.

10. A waveguide photo-amplfier comprising the optical waveguide as defined in claim 3;
- a multi-mode semiconductor laser for excitation which ejects a multi-mode laser ray for exciting the rare-earth group ion and/or the transition metal ion contained in the single-mode waveguide constituting the optical waveguide; and
- an input element for making the multi-mode laser ray incident on the multi-mode waveguides constituting the optical waveguide,
- a signal ray being incident on a facet of the single-mode waveguide, and optical amplification of the single-mode waveguide being conducted by induced radiation generated by the signal ray excited by the rare-earth group ion and/or the transition metal ion.

11. The waveguide photo-amplifier as defined in claim 10, wherein the single-mode waveguide includes an output-facet of the photo-amplified signal ray which is formed by induced-radiating a facet on which the signal ray is incident, and a totally reflecting mirror for the signal ray at an opposite facet to the above facet; and a circulator for making the signal ray incident on the single-mode waveguide and for taking out the photo-amplified signal ray from the output facet of the single-mode waveguide.

12. A waveguide photo-amplifier comprising the optical waveguide as defined in claim 4;
- a plurality of multi-mode semiconductor lasers for excitation mounted on each of the input waveguides of the multi-mode waveguides constituting the optical waveguide, which eject a multi-mode laser ray for exciting the rare-earth group ion and/or the transition metal ion added in the single-mode waveguide constituting the optical waveguide; and
- a plurality of input elements mounted on each of the multi-mode semiconductor lasers for excitation for making the multi-mode laser ray ejected from each of the multi-mode semiconductor lasers for excitation incident on the input waveguide corresponding to the multi-mode waveguides,
- a signal ray being incident on a facet of the single-mode waveguide, and optical amplification of the single-mode waveguide being conducted by induced radiation generated by the signal ray excited by the rare-earth group ion and/or the transition metal ion.

13. The waveguide photo-amplifier as defined in claim 12, wherein a semiconductor laser bar including a plurality of light generation elements linearly disposed having a specified space among them is mounted in place of the multi-mode semiconductor lasers for excitation, and the laser ray ejected from each of the light generation elements of the semiconductor laser bar is incident on the plurality of the input elements.

* * * * *